United States Patent
Barbat et al.

(10) Patent No.: US 10,252,648 B2
(45) Date of Patent: Apr. 9, 2019

(54) INERTIA DRIVEN ROTATABLE UPPER SEAT PORTION FOR REAR PASSENGER HEAD CLEARANCE

(71) Applicant: Ford Global Technologies, LLC, Dearborn, MI (US)

(72) Inventors: Saeed David Barbat, Novi, MI (US); Dean M. Jaradi, Macomb, MI (US); Mohammed Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 344 days.

(21) Appl. No.: 15/198,790

(22) Filed: Jun. 30, 2016

(65) Prior Publication Data
US 2018/0001802 A1   Jan. 4, 2018

(51) Int. Cl.
*B60N 2/68* (2006.01)
*B60N 2/427* (2006.01)
*B60N 2/42* (2006.01)
*B60N 2/64* (2006.01)

(52) U.S. Cl.
CPC .......... *B60N 2/427* (2013.01); *B60N 2/4221* (2013.01); *B60N 2/42745* (2013.01); *B60N 2/64* (2013.01); *B60N 2/68* (2013.01)

(58) Field of Classification Search
CPC .. B60N 2/427; B60N 2/4221; B60N 2/42745; B60N 2/64; B60N 2/68
USPC ........................... 297/216.12–216.14, 354.11
See application file for complete search history.

(56) References Cited

U.S. PATENT DOCUMENTS

| | | | | |
|---|---|---|---|---|
| 4,157,203 A | * | 6/1979 | Ambasz ................. | A47C 7/441 297/285 |
| 5,370,440 A | * | 12/1994 | Rogala ................... | B60N 2/433 297/216.14 |
| 5,772,280 A | | 6/1998 | Massara | |
| 5,795,019 A | * | 8/1998 | Wieclawski ......... | B60N 2/2222 297/216.12 |
| 6,019,424 A | * | 2/2000 | Ruckert ............... | B60N 2/2222 297/216.12 |
| 6,199,947 B1 | | 3/2001 | Wiklund | |
| 6,213,549 B1 | * | 4/2001 | Wieclawski ......... | B60N 2/2222 297/216.13 |
| 6,312,050 B1 | * | 11/2001 | Eklind ................. | B60N 2/4221 297/216.15 |

(Continued)

*Primary Examiner* — Syed A Islam
(74) *Attorney, Agent, or Firm* — Vichit Chea; Price Heneveld LLP

(57) ABSTRACT

A seating assembly for a vehicle includes a base. A seatback having a lower portion is rotatably coupled to the base and an upper portion is pivotably coupled to the lower portion by at least one pivot joint. The at least one pivot joint is disposed on a front portion of the seatback. A guide bracket is disposed on a rear portion of the seatback and is configured to guide the upper portion of the seatback between a resting position and a deployed position. A resilient member provides a resistance to pivoting of the upper portion of the seatback and the resilient member is operably coupled to the upper portion of the seatback and the lower portion of the seatback. The upper portion of the seatback pivots from the resting position to the deployed position during a frontal collision of the vehicle.

20 Claims, 8 Drawing Sheets

(56) References Cited

U.S. PATENT DOCUMENTS

| | | | | |
|---|---|---|---|---|
| 6,375,262 B1* | 4/2002 | Watanabe | ............ | B60N 2/4228 |
| | | | | 297/284.4 |
| 6,631,955 B2* | 10/2003 | Humer | .................... | B60N 2/888 |
| | | | | 297/408 |
| 7,104,607 B2* | 9/2006 | Yasuda | ................ | B60N 2/2222 |
| | | | | 297/354.1 |
| 7,712,833 B2* | 5/2010 | Ueda | .................. | A47C 1/03255 |
| | | | | 297/296 |
| 7,845,729 B2* | 12/2010 | Yamada | ............... | B60N 2/0232 |
| | | | | 297/284.1 |
| 9,415,713 B2* | 8/2016 | Line | ........................ | B60N 2/643 |
| 9,776,533 B2* | 10/2017 | Line | ..................... | B60N 2/2222 |
| 2008/0252128 A1* | 10/2008 | Nishikawa | ........... | B60N 2/2222 |
| | | | | 297/354.11 |
| 2010/0231013 A1 | 9/2010 | Schlenker | | |

\* cited by examiner

US 10,252,648 B2

INERTIA DRIVEN ROTATABLE UPPER SEAT PORTION FOR REAR PASSENGER HEAD CLEARANCE

FIELD OF THE INVENTION

The present invention generally relates to vehicle seating, and more specifically, vehicle seating having a rotationally collapsible seatback that is operable during a collision event.

BACKGROUND OF THE INVENTION

Various automobile seating can be selectively operable during specific situations, such as during a collision event. Such vehicle seats can operate according to the movements of passengers during a particular type of collision to avoid portions of the vehicle from contacting individuals within the passenger cabin of the vehicle.

SUMMARY OF THE INVENTION

According to one aspect of the present invention, a seating assembly for a vehicle includes a base. A seatback having a lower portion is rotatably coupled to the base and an upper portion is pivotably coupled to the lower portion by at least one pivot joint. The at least one pivot joint is disposed on a front portion of the seatback. A guide bracket is disposed on a rear portion of the seatback and is configured to guide the upper portion of the seatback between a resting position and a deployed position. A resilient member provides a resistance to pivoting of the upper portion of the seatback and the resilient member is operably coupled to the upper portion of the seatback and the lower portion of the seatback. The upper portion of the seatback pivots from the resting position to the deployed position during a frontal collision of the vehicle.

According to another aspect of the present invention, a seating assembly for a vehicle includes a seatback having an upper portion pivotably coupled to a lower portion by at least one pivot joint. The at least one pivot joint is disposed on a front portion of the seatback. A resilient member operably couples the upper portion of the seatback to the lower portion of the seatback.

According to another aspect of the present invention, a seating assembly for a vehicle includes a seatback having an upper portion pivotably coupled to a lower portion by at least one pivot joint. The at least one pivot joint is disposed on a front portion of the seatback.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
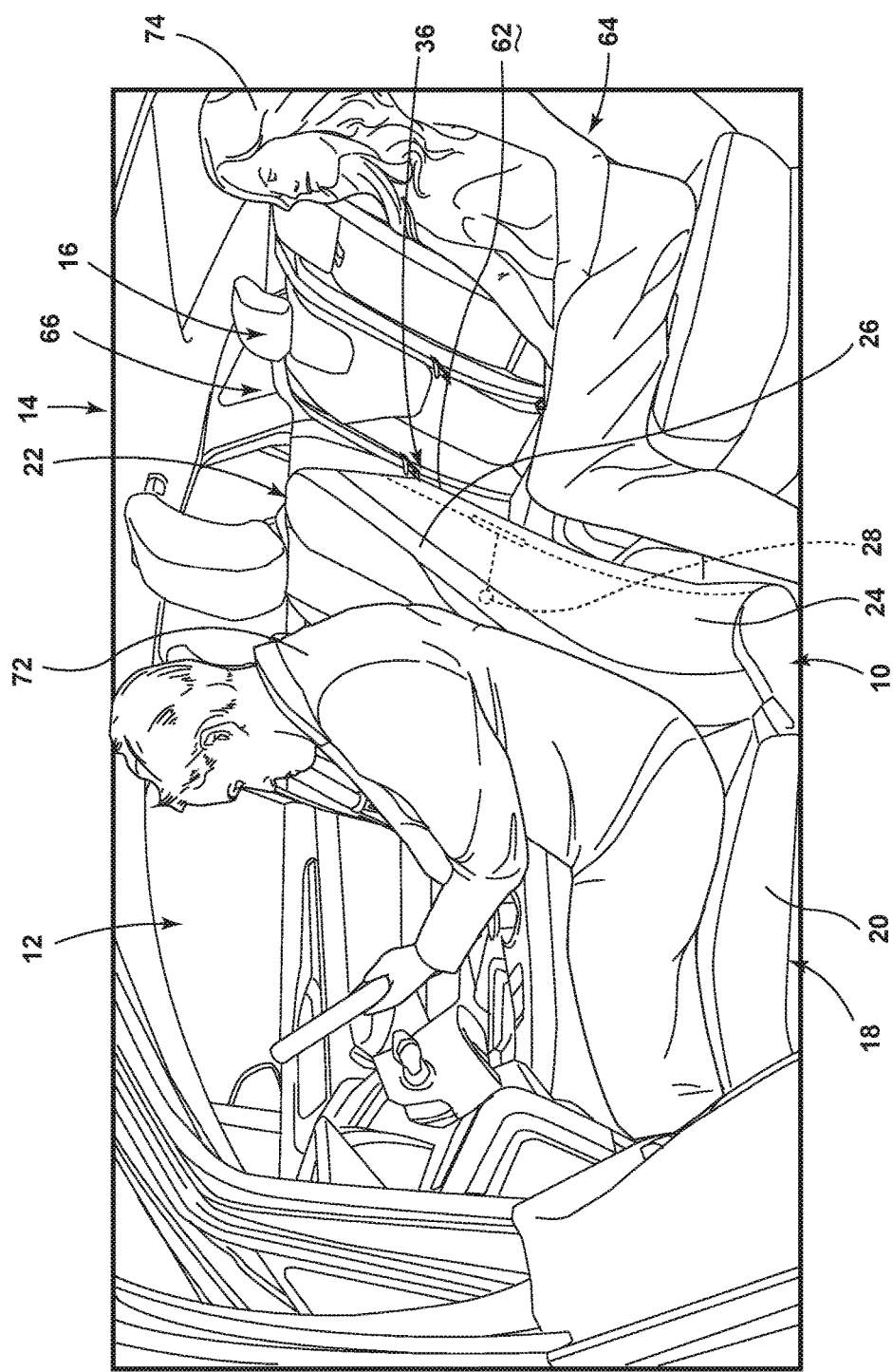
FIG. 1 is a side perspective view of a passenger cabin of a vehicle having vehicle seats that incorporate an aspect of the inertia-driven seatback.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-5, reference numeral 10 generally refers to a vehicle seat that can be disposed within a passenger cabin 12 of a vehicle 14, where the vehicle seat 10 is typically a vehicle seat 10 having at least one seating position disposed rearward within the passenger cabin 12, and typically, a vehicle seat 10 within a front row 18. According to the various embodiments, the seating assembly disclosed herein can include a vehicle seat 10 for a vehicle 14 having a base 20 and a seatback 22 rotationally coupled to the base 20. The seatback 22 can include a lower portion 24 that is rotationally coupled to the base 20 and an upper portion 26 that is pivotally coupled to the lower portion 24 by at least one pivot joint 28. It is contemplated that the at least one pivot joint 28 is disposed on or proximate the front portion 30 of the seatback 22 between the upper and lower portions 26, 24 thereof. A guide bracket 32 can be disposed on a rear portion 34 of the seatback 22. The guide bracket 32 can be configured to guide the upper portion 26 of the seatback 22 between a resting position 36 and a deployed position 38. It is contemplated that the deployed position 38 is defined by the upper portion 26 of the seatback 22 being rotated forward with respect to the lower portion 24 of the seatback 22, such as in response to a forward or oblique collision event experienced by the vehicle 14. A resilient member 40 is included proximate the pivot joint 28, wherein the resilient member 40 provides a resistance 42 to the pivoting motion 44 of the upper portion 26 of the seatback 22 with respect to the lower portion 24 of the seatback 22. The resilient member 40 is operably coupled to the upper portion 26 of the seatback 22 and the lower portion 24 of the seatback 22, wherein the upper portion 26 of the seatback 22 pivots from the resting position 36 to the deployed position 38 during a frontal or oblique collision of the vehicle 14.

Referring again to FIGS. 1-5, it is contemplated that in the resting position 36, the seatback 22 for the vehicle seat 10 is disposed in a configuration similar to that of a typical seatback. During a front or oblique collision event, the forward momentum 50 of the vehicle 14 is suddenly altered, such that the vehicle 14 experiences a deceleration force 52. The forward momentum 50 or inertial forces of the seatback 22 and the substantially opposing deceleration force 52 applied to the vehicle 14 during the frontal and/or oblique collision serves to provide sufficient force to overcome the resistance 42 to the pivoting motion 44 of the upper portion 26 of the seatback 22 that is provided by the resilient member 40 and/or the guide bracket 32 disposed proximate the pivot joint 28 of the seatback 22. In this manner, the deceleration force 52 applied to the vehicle 14 during the frontal and/or oblique collision, combined with the forward momentum 50 or inertial forces experienced by the seatback 22, and in particular, the upper portion 26 of the seatback 22, initiates movement, in the form of the pivoting motion 44, of the upper portion 26 of the seatback 22 from the resting position 36 to the deployed position 38 in a passive or automatic fashion. Accordingly, the altered forward momentum 50 of the upper portion 26 of the seatback 22 causes the pivoting motion 44 of the upper portion 26 of the seatback 22 that opposes the drastic deceleration forces 52 applied to other portions of the vehicle 14. These opposing forces overcome one or both of the guide bracket 32 and the resilient member 40 that serve to retain the upper portion 26 of the seatback 22 in the resting position 36. Once the resistance 42 defined by the guide bracket 32 and resilient member 40 are overcome, the upper portion 26 of the seatback 22 rotates forward from the resting position 36 to the deployed position 38.

Figure 2:
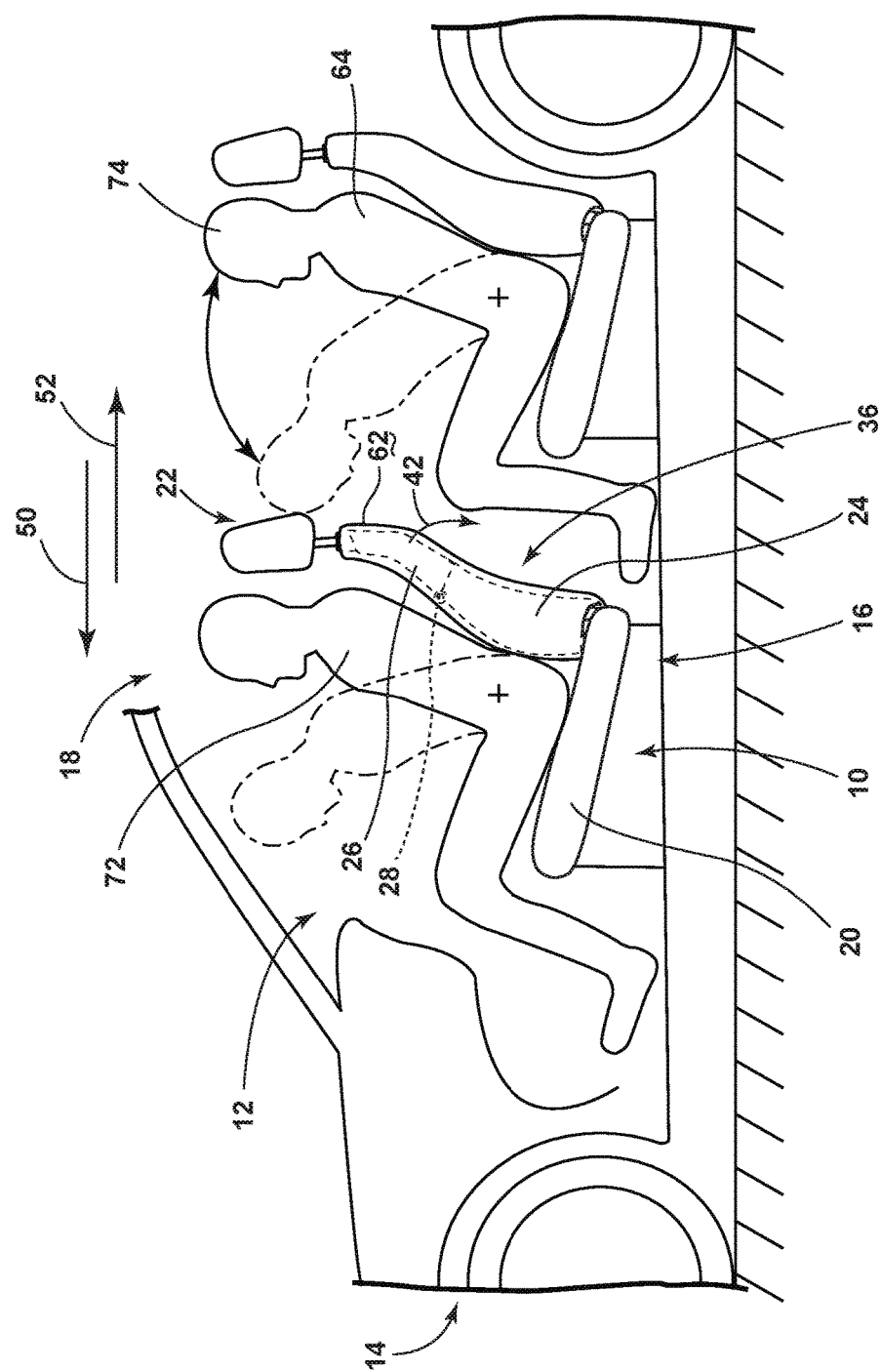
FIG. 2 is a schematic cross-sectional view of a vehicle incorporating vehicle seats having the inertia-driven seatback incorporated therein and shown in the resting position.
Figure 3:
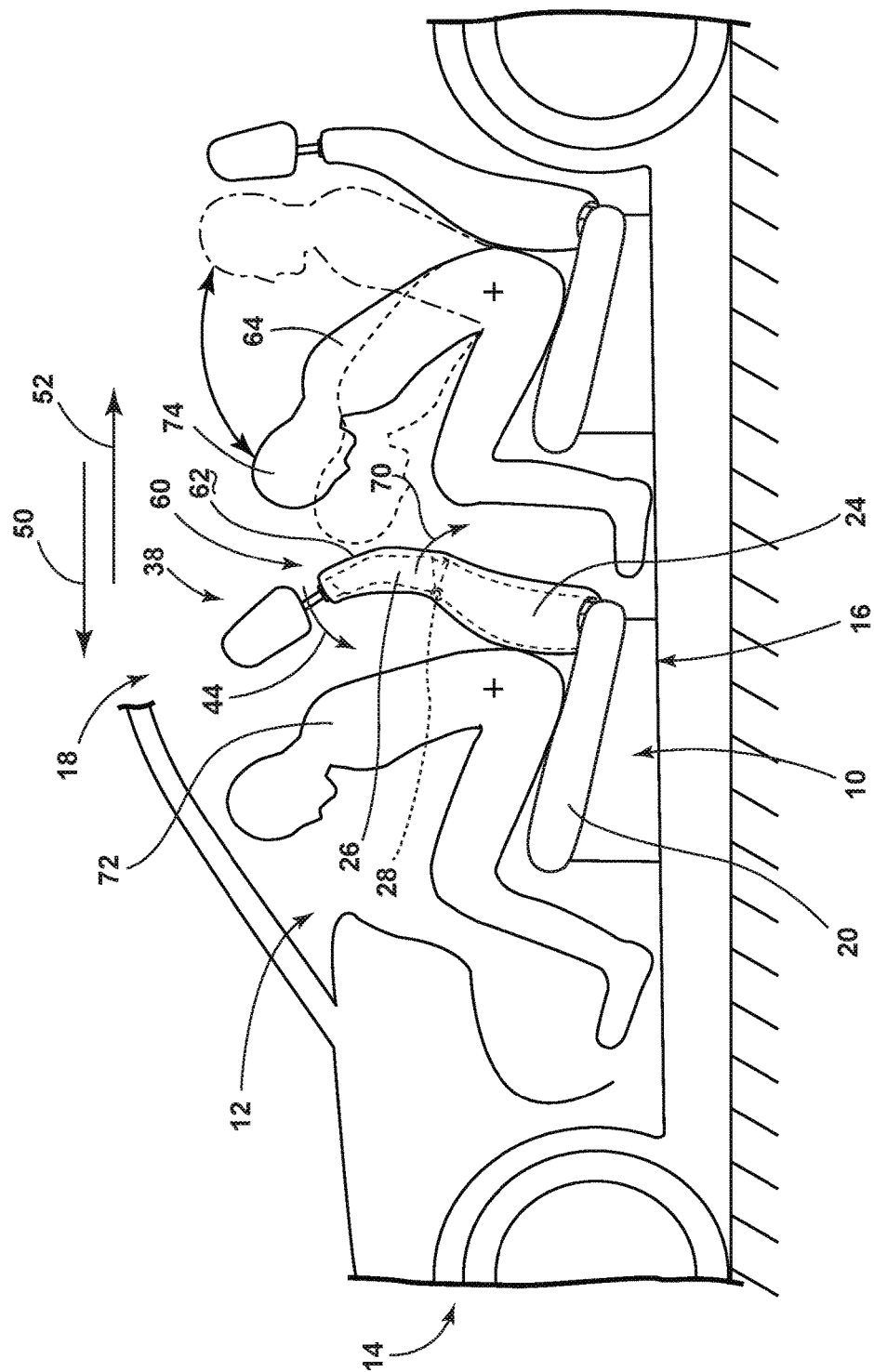
FIG. 3 is a schematic cross-sectional view of the vehicle of FIG. 2 showing the inertia-driven seatback in the deployed position.

As exemplified in FIGS. 2 and 3, as the upper portion 26 of the seatback 22 moves toward the deployed position 38, a clearance space 60 is created behind the rear surface 62 of the upper portion 26 of the seatback 22 to provide additional clearance to rear passengers 64 within rearward portions 66 of the passenger cabin 12. This clearance space 60 behind the upper portion 26 of the seatback 22 serves to provide conditions that make it less likely that an individual in a rearward portion 66 of the passenger cabin 12 will collide with the upper portion 26 of the seatback 22 during a frontal and/or oblique collision involving the vehicle 14.

Referring again to FIGS. 2-5, the resilient member 40, during the movement of the upper portion 26 of the seatback 22 from the resting position 36 to the deployed position 38, exerts a return biasing force 70 that biases the upper portion 26 of the seatback 22 in a return direction toward the resting position 36. In this manner, the upper portion 26 of the seatback 22, once in the deployed position 38, tends to return to the resting position 36, through the biasing force 70 exerted by the resilient member 40. In this manner, the upper and lower portions 26, 24 of the seatback 22 remain in a position that serves to receive the occupant 72 of the vehicle seat 10 during the collision, and in particular, as the occupant 72 returns into engagement with the upper and lower portions 26, 24 of the seatback 22 during various phases of the frontal and/or oblique collision event. Stated another way, the clearance space 60 provided by the pivoting motion 44 of the upper portion 26 of the seatback 22 from the resting position 36 to the deployed position 38 may be a temporary event or condition that provides the clearance space 60 during times when the head 74 of a rear passenger 64 may be moved forward as a result of the collision. This clearance space 60 may disappear through the return of the upper portion 26 of the seatback 22 to the resting position 36 as a result of the biasing force 70 of the resilient member 40 to receive the upper body of the occupant 72, such as a front passenger, during the collision. The return of the upper portion 26 of the seatback 22 to the resting position 36 can be timed and/or tuned such that the head 74 of the rear passenger 64 is out of, or substantially out of, the clearance space 60 so that the upper portion 26 of the seatback 22 is free to return to the resting position 36 without colliding with the head 74 or other portion of the rear passenger 64.

Referring now to FIGS. 4-8, the resilient member 40 positioned proximate the pivot joint 28 between the upper and lower portions 26, 24 of the seatback 22 can be any one of various resilient members 40 that can include, but are not limited to, a cable 80, a coil spring 82, the tension spring 84, elastic members, combinations thereof and other similar resilient members 40. In the case of generally linear-type resilient members 40, such as a cable 80 or a coil spring 82, the cable 80 or coil spring 82 may be disposed proximate the rear portion 34 of the seatback 22 and opposite the pivot joint 28. In the case of a rotational resilient member 40, such as the tension spring 84, the tension spring 84 may be located at the pivot joint 28 to dampen, bias, or otherwise control the pivoting motion 44 of the upper portion 26 of the seatback 22 during the collision event.

Figure 4:
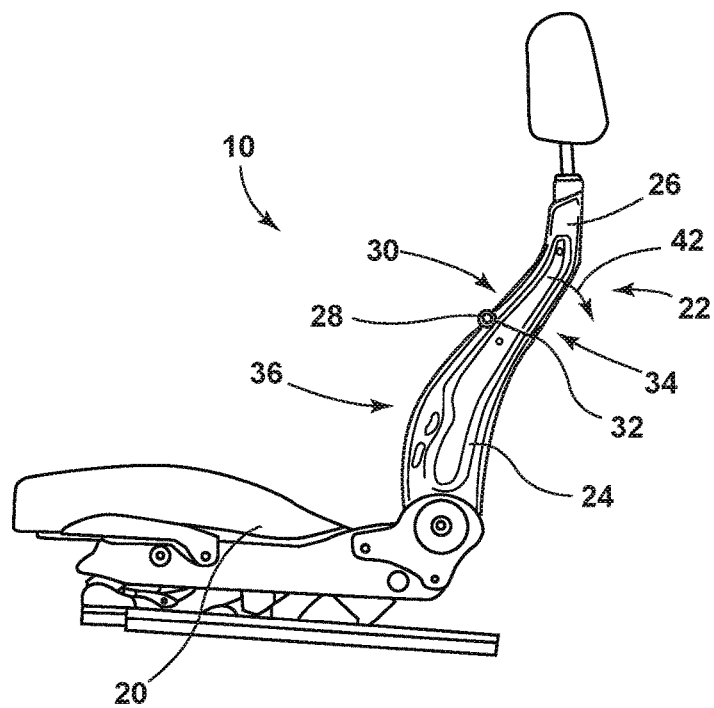
FIG. 4 is a side elevational view of a frame for a vehicle seat incorporating an aspect of the inertia-driven seatback and shown in the resting position.
Figure 5:
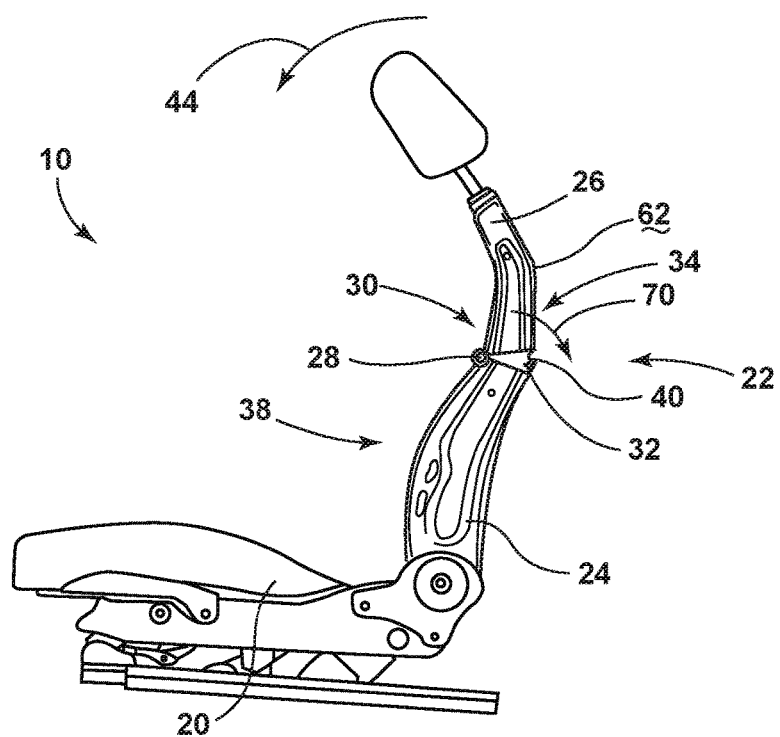
FIG. 5 is an elevational view of the frame of FIG. 4 showing the inertia-driven seatback in the deployed position.
Figure 6:
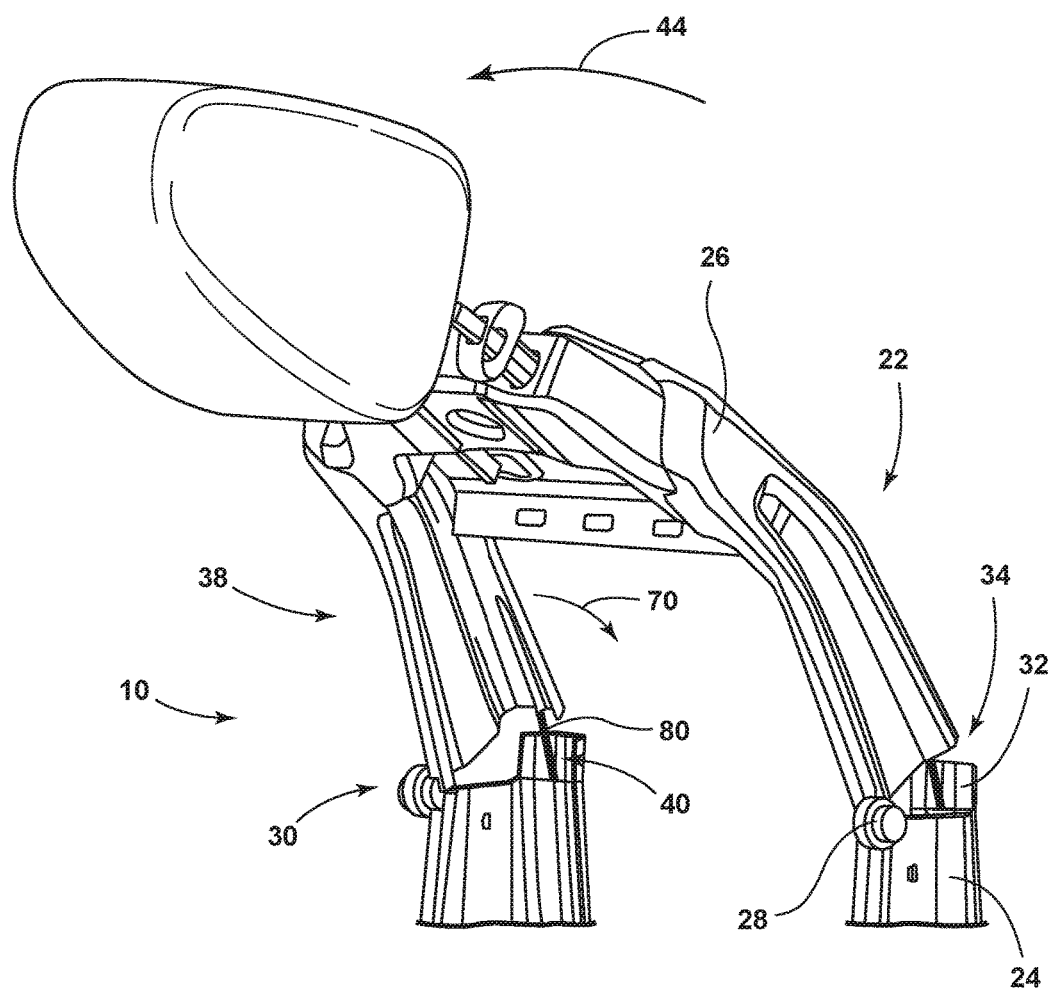
FIG. 6 is a side perspective view of the inertia-driven seatback in the deployed position.
Figure 7:
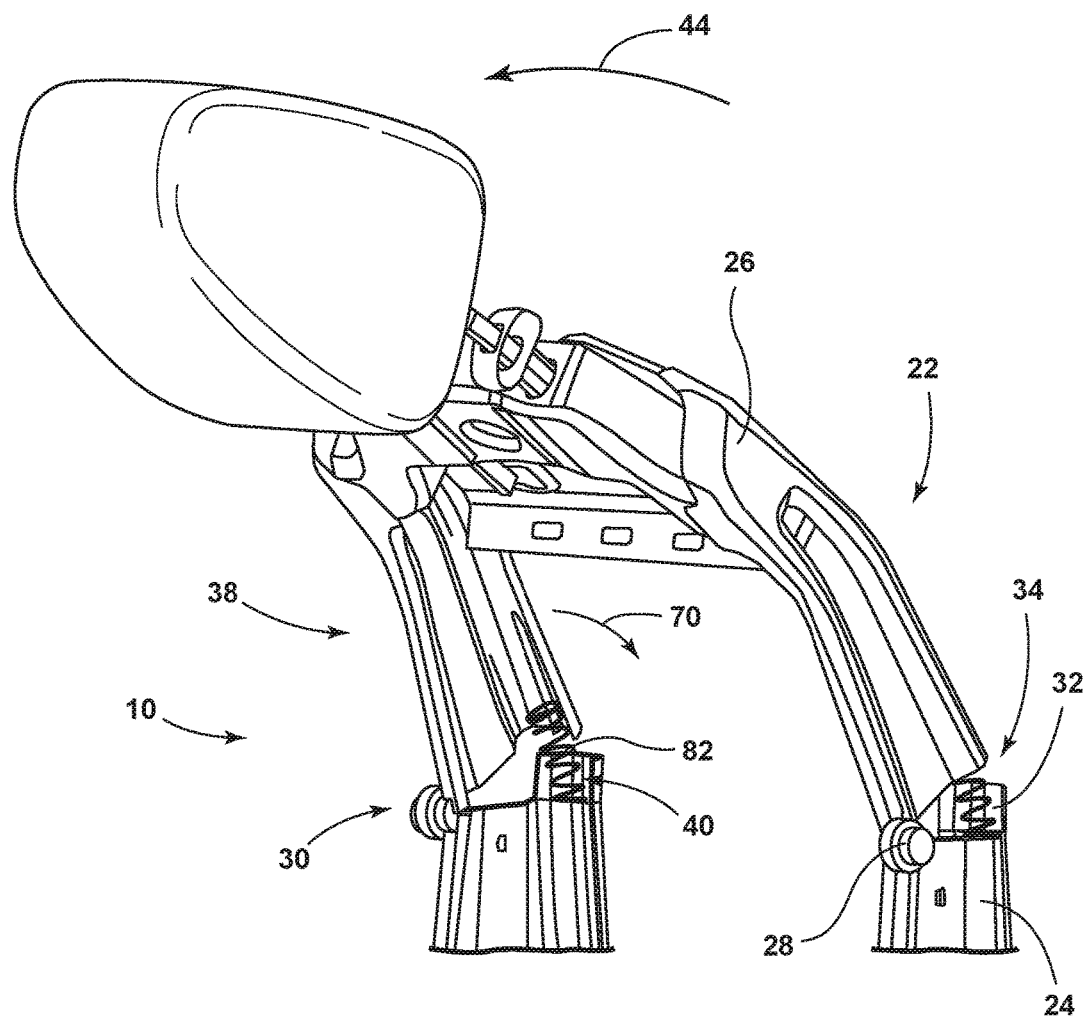
FIG. 7 is an aspect of the inertia-driven seatback shown in the deployed position.
Figure 8:
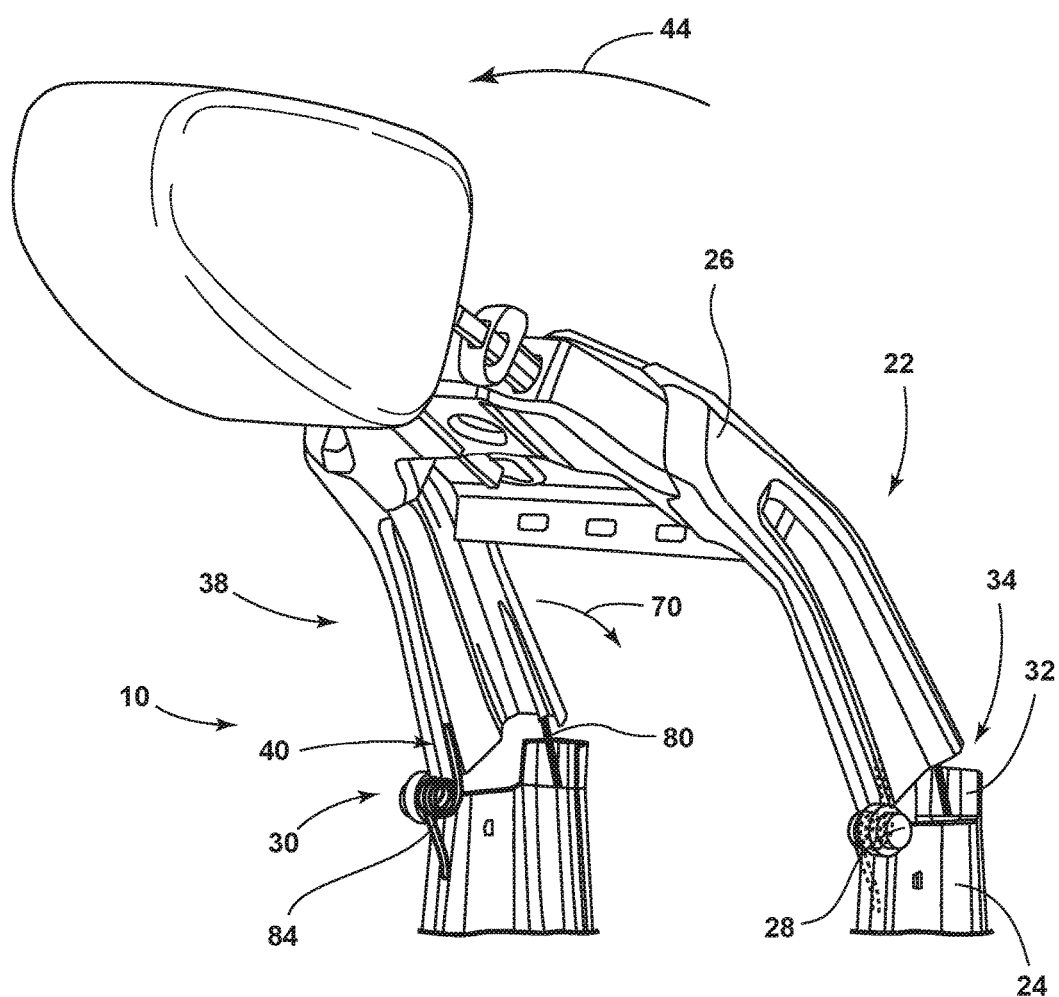
FIG. 8 is an aspect of the inertia-driven seatback shown in the deployed position.
Figure 9:
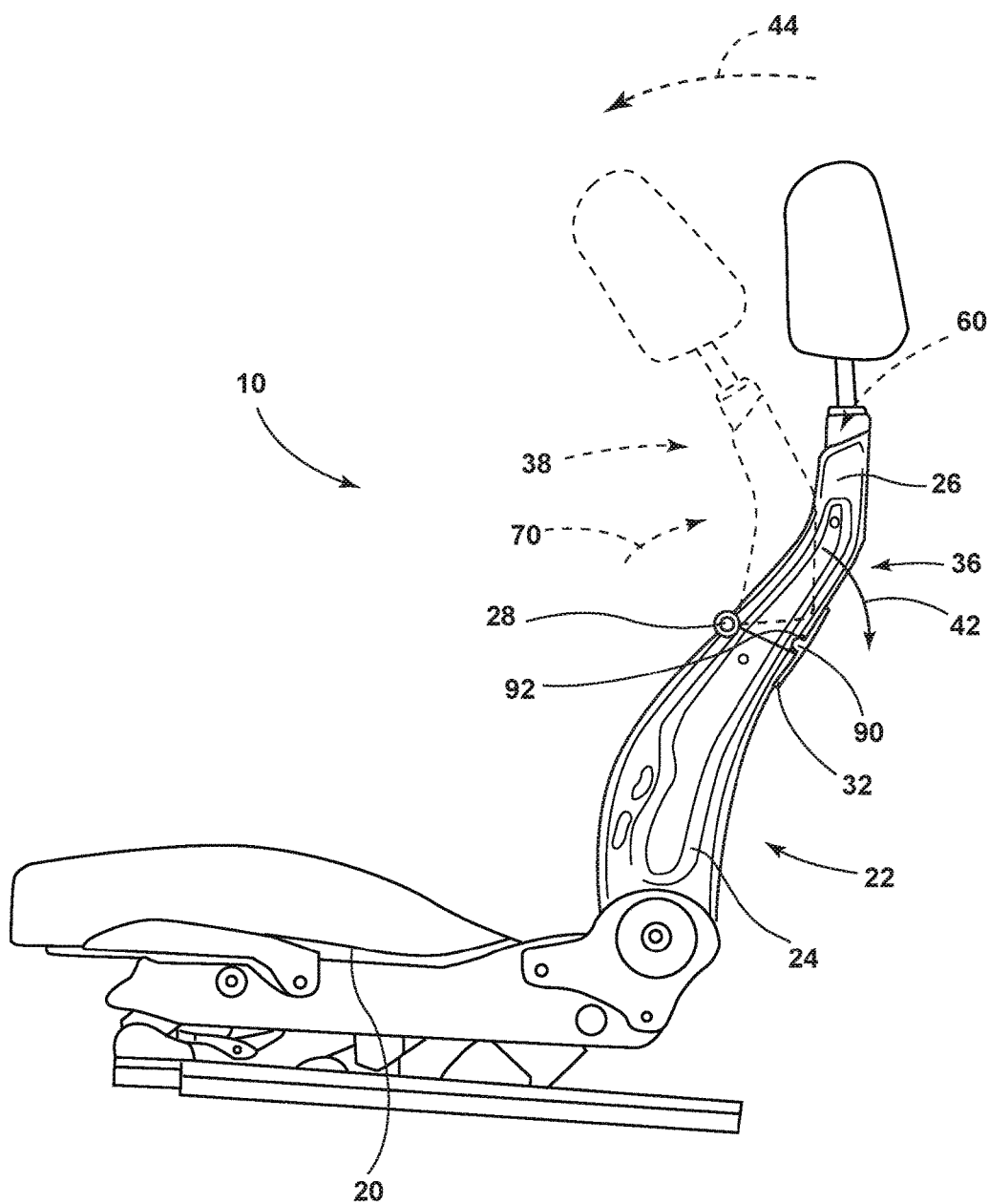
FIG. 9 is a side elevational view of a frame for a vehicle seat incorporating an aspect of the inertia-driven seatback shown in the resting position.

Referring now to FIGS. 4, 5 and 9, the guide bracket 32 can extend upward from the lower portion 24 of the seatback 22, or can extend downward from the upper portion 26 of the seatback 22. In either case, it is contemplated that the guide bracket 32 serves to at least partially define the resting position 36 of the upper portions 26 of the seatback 22. To assist in selectively retaining the upper and lower portions 26, 24 of the seatback 22 in the resting position 36, the guide bracket 32 can include a protrusion 90 that operably couples with one of the upper and lower portions 26, 24 of the seatback 22. The protrusion 90 can define an interference fit with a receptacle 92 defined within the other of the upper and lower portions 26, 24 of the seatback 22, where the engagement of the protrusion 90 and receptacle 92 increases the resistance 42 to the pivoting motion 44 of the upper portion 26 of the seatback 22 from the resting position 36 to the deployed position 38. Accordingly, the engagement of the protrusion 90 and the receptacle 92 can be tuned such that a minimal amount of forward force produced by a particular collision event (forward momentum 50 minus deceleration force 52) is necessary to disengage the protrusion 90 from the receptacle 92 and overcome the resistance 42 to the pivoting motion 44 of the upper portion 26 of the seatback 22 to allow the upper portion 26 of the seatback 22 to rotate toward the deployed position 38.

According to the various embodiments, it is contemplated that the engagement between the protrusion 90 and the receptacle 92 can be an interference fit, a detent engagement, or other similar selectively operable engagement. It is also contemplated that the disengagement of the protrusion 90 with the receptacle 92 is a one-time engagement that cannot be reattached after the upper portion 26 of the seatback 22 has moved into the deployed position 38. In such a condition, it is contemplated that the vehicle seat 10 would require replacement after the collision event.

Referring again to FIG. 9, it is contemplated that the guide bracket 32 can be fixedly attached to the lower portion 24 of the seatback 22. In this embodiment, the protrusion 90 engages a receptacle 92 defined within the upper portion 26 of the seatback 22. As discussed above, the engagement of the protrusion 90 with the receptacle 92 serves to define the resting position 36 of the upper and lower portions 26, 24 of the seatback 22. Additionally, the engagement between the protrusion 90 and the receptacle 92 can define an operable coupling between these two portions that serves to define the resting position 36. As discussed above, the engagement can be selective such that the upper portion 26 of the seatback 22 can be reengaged with the lower portion 24 of the seatback 22 in the resting position 36 through reengagement of the protrusion 90 with the receptacle 92. Alternatively, the engagement between the protrusion 90 and the receptacle 92 can be a one-time engagement such that disengagement results in deformation or damage of one or both of the receptacle 92 and the protrusion 90 such that reengagement of the protrusion 90 and the receptacle 92 is not permissible.

As discussed above, the incorporation of the inertia-driven seatback 22 that incorporates the upper and lower portions 26, 24 that are rotationally coupled at the pivot point serves to provide an at least temporary clearance space 60 behind the rear surface 62 of the seatback 22 during a frontal and/or oblique collision event. This clearance space 60 at least partially prevents the head 74 of a rear passenger 64 from colliding with the rear surface 62 of the seatback 22. Additionally, the resilient member 40 extending between the upper and lower portions 26, 24 of the seatback 22 serve to bias the upper portion 26 of the seatback 22 toward the resting position 36 such that the body of the front passenger can be received by the seatback 22 either in the resting position 36 or substantially in the resting position 36.

According to the various embodiments, the inertia-driven seatback 22 can be incorporated within various seating positions 16 within a vehicle 14, where such seating positions 16 can include front row seating positions, middle row seating positions, and other seating positions that have another seating position 16 located behind the rear surface 62 of the seatback 22 having the upper and lower portions 26, 24 of the seatback 22. It is also contemplated that the inertia-driven seatback 22 can be incorporated within various seating types that can include, but are not limited to, Captain's chairs, bench seating, collapsible seating, and other similar seating types.

According to the various embodiments, it is contemplated that the inertia-driven seatback 22 can incorporate a lockout function that prevents the upper portion 26 of the seatback 22 from moving forward to the deployed position 38 under certain circumstances, such as where operation of the upper portion 26 of the seatback 22 toward the deployed position 38 may not be desired.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seating assembly for a vehicle comprising:
   a base;
   a seatback having a lower portion rotatably coupled to the base and an upper portion pivotably coupled to the lower portion by at least one pivot joint, wherein the at least one pivot joint is disposed on a front portion of the seatback;
   a guide bracket disposed on a rear portion of the seatback and configured to guide the upper portion of the seatback between a resting position and a deployed position, wherein the guide bracket extends upward from a rear portion of the lower portion and receives a back of the upper portion in the resting position; and
   a resilient member providing a resistance to pivoting of the upper portion of the seatback and the resilient member operably coupled to the upper portion of the seatback and the lower portion of the seatback, wherein the upper portion of the seatback pivots from the resting position to the deployed position during a frontal collision of the vehicle.

2. The seating assembly of claim 1, wherein the guide bracket further comprises a protrusion that operably couples with the upper portion of the seatback and increases the resistance to pivoting motion of the upper portion of the seatback.

3. The seating assembly of claim 1, wherein the resilient member is a cable.

4. The seating assembly of claim 1, wherein the resilient member is a coil spring.

5. The seating assembly of claim 1, wherein the resilient member is a tension spring located on the at least one pivot joint.

6. The seating assembly of claim 1, wherein the resilient member returns the upper portion of the seatback to the resting position from the deployed position.

7. The seating assembly of claim 1, wherein forward momentum of the seatback and deceleration of the vehicle during the frontal collision provide sufficient force to overcome the resistance to pivoting motion of the upper portion of the seatback, thereby initiating movement of the upper portion of the seatback from the resting position to the deployed position automatically.

8. A seating assembly for a vehicle comprising:
   a seatback having an upper portion pivotably coupled to a lower portion by at least one pivot joint, wherein the at least one pivot joint is disposed on a front portion of the seatback, the lower portion having an upward extending guide bracket, the upward extending guide bracket having a protrusion that selectively engages a back of the upper portion to selectively retain the upper portion in a resting position; and
   a resilient member operably coupling the upper portion of the seatback to the lower portion of the seatback.

9. The seating assembly of claim 8, wherein the resilient member is a cable.

10. The seating assembly of claim 8, wherein the resilient member is a coil spring.

11. The seating assembly of claim 8, wherein the resilient member is a tension spring located on the at least one pivot joint.

12. The seating assembly of claim 8, wherein the upward extending guide bracket is
    disposed on a rear portion of the seatback and is configured to guide the upper portion of the seatback between the resting position and a deployed position during a frontal collision of the vehicle.

13. The seating assembly of claim 12, wherein the pivoting of the upper portion of the seatback from the resting position to the deployed position is automatically initiated by forward momentum of the seatback and deceleration of the vehicle during the frontal collision.

14. The seating assembly of claim 12, wherein the protrusion of the upward extending guide bracket operably couples with the upper portion of the seatback and provides an increased resistance to pivoting motion of the upper portion of the seatback.

15. A seating assembly comprising:
    a seatback having an upper portion pivotably coupled to a lower portion by at least one pivot joint, wherein the at least one pivot joint is disposed on a front portion of the seatback; and a guide bracket extending upward from a rear portion of the lower portion and selectively guiding the upper portion between a resting position and a deployed position during a frontal collision of a vehicle.

16. The seating assembly of claim 15, further comprising:
a resilient member operably coupling the upper portion of the seatback to the lower portion of the seatback.

17. The seating assembly of claim 15, further comprising:
a protrusion of the guide bracket that engages the upper portion of the seatback in the resting position.

18. The seating assembly of claim 16, wherein the resilient member is a cable.

19. The seating assembly of claim 16, wherein the resilient member is a tension spring located on the at least one pivot joint.

20. The seating assembly of claim 17, wherein the pivoting of the upper portion of the seatback from the resting position to the deployed position is automatically initiated by forward momentum of the seatback and deceleration of the vehicle during the frontal collision.

* * * * *